G. W. COLE.

Corn Stalk Cutter.

No. 3,874.

Reissued May 8, 1870.

Witnesses:

Geo. Smith.

M. C. Mitchell.

Inventor:

C. W. Cole.

By F. E. Theakes his attorney.

N. PETERS, Photo-Lithographer, Washington, D. C.

UNITED STATES PATENT OFFICE.

G. W. COLE, OF FARMINGTON, ILLINOIS.

IMPROVEMENT IN CORNSTALK-CUTTERS.

Specification forming part of Letters Patent No. 39,214, dated July 14, 1863; Reissue No. 3,874, dated March 8, 1870.

*To all whom it may concern:*

Be it known that I, GIDEON W. COLE, of Farmington, county of Fulton, and State of Illinois, have invented a new and useful Improvement in Cornstalk-Cutters; and I do hereby declare the following to be a full, clear, and exact description thereof, reference being had to the accompanying drawings, in which—

Figure 1:
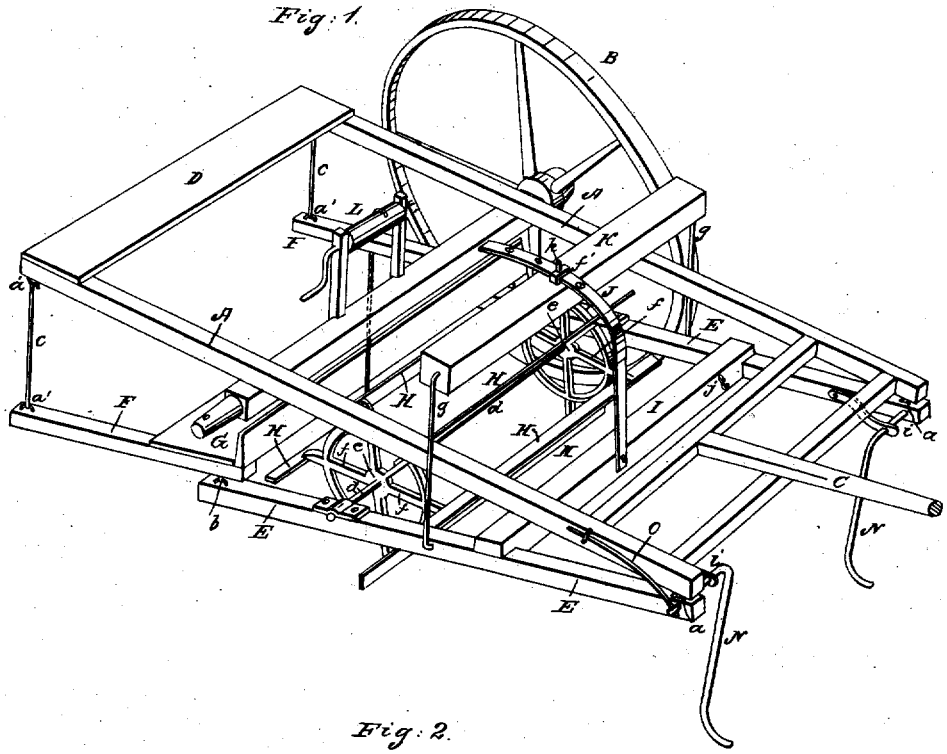
Figure 2:
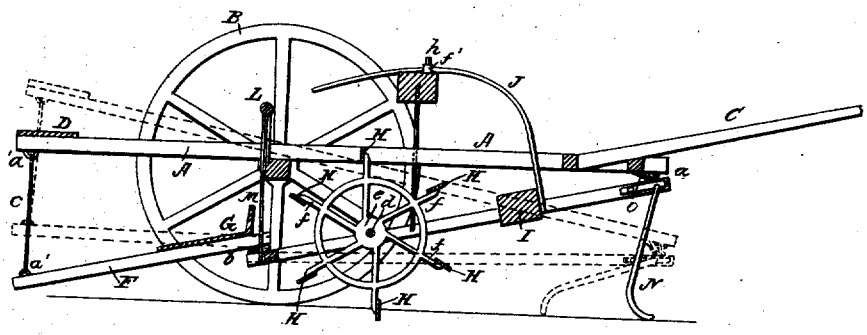

Figure 1 is a perspective view, one wheel being removed; and Fig. 2 is a longitudinal vertical section, like letters designating like parts in all the figures.

The invention relates to a machine for cutting up standing cornstalks on the field; and it consists in the employment or use of a series of cutters arranged on radial arms, which are secured to the shaft, that is journaled in a swinging frame which is provided with an adjustable weight, in combination with another frame connected thereto, both swinging frames being hung below and connected to the main frame, which is mounted on wheels; also, using gathering-hooks, which are attached to the front end of the forward swinging frame; also, attaching to the main frame a windlass, by means of which the swinging frame and cutters can be elevated to any desired height above the surface of the ground when the machine is not in use or turning, &c.

To enable those skilled in the art to make and use my invention, I will proceed to describe its construction and operation.

A represents a rectangular frame, which is mounted on wheels B B, to the front end of which frame the draft-pole C is attached.

On the rear end of the frame A is secured the driver's seat D.

Under the frame A is a rectangular frame, E, which is connected to the frame A at its front end by joints or hinges *a*. The swinging frame E extends back from the front end of the frame A a distance about equal to the distance between the axle of the wheels B B and the front end of the frame A. Under that part of the frame A back of the said axle is another frame, F, composed of two side pieces, F F, and a foot-board, G, the front end of the two side pieces being held apart the width of the frame A by a foot-board, G, to which they are secured, their rear ends being connected to the frame A by means of the rods *c*, on the ends of which are hooks which hook into staples *a′ a′* in the frames A F, and their front ends extended over the rear end of the frame E, and are connected thereto by joints or hinges *b*.

Between the two sides of the swinging frame E is a shaft, *d*, on which the hubs *e e* are placed and keyed. Extending from these hubs are radial arms *f*, on the outer ends of which are secured the cutters H, which are parallel to the shaft *d* and extend beyond the hubs *e e*, so as to be nearly equal in length to the distance between the side pieces of the frame E. These cutters are allowed to rotate freely in the frame E, and to this frame is secured a bar, I. Attached to this bar is a curved rod or bar, J, which extends upward and back, as seen in Fig. 1. On the curved rod or bar J, by means of the staples or eyes *f*, is hung a weight-bar, K. Attached to each end of this weight-bar K is a rod, *g*, the lower end of which passes into and turns freely in the sides of the frame E. In the rod or bar J are several holes, and there is also one in the staple *f′*. By placing the hole in the staple over one of the holes in the bar J the pin *h* can be passed through, thus holding the weight-bar K in any desired position.

To the axle of the wheels B B is attached a windlass, L.

To the rear end of the swinging frame E is attached a rope, M, the other end of which is attached to the windlass L.

To the front end of the frame E there are attached two pendent hooks, N N, one being attached to each side. These hooks are curved forward and nearly or quite touch the ground as the machine moves forward. These hooks have their shanks bent in a horizontal position at their upper ends, which pass through the forward part of the frame E and are allowed to turn freely therein.

Attached to the outer end of the horizontal part *i i* are springs *o*, which have a tendency to keep the hooks N in a downward position, or to their work, the frame A, when the machine is at work, being in an inclined position, as indicated by dotted lines in Fig. 2.

Its operation is as follows: As the machine is drawn forward the hooks N N will gather the lodged stalks in line with the cutters H, and enable them to cut the stalks into pieces as they pass over them. The cutters have a sufficient pressure given them to perform this work by means of the weight-bar K, which may be adjusted to and secured at any desired position on the curved bars J by means of the pin *h*, which passes through the staple *f'* and bar J, as hereinbefore described. The farther back the weight-bar K is placed the greater will be the pressure exerted on the cutters H; or if more pressure is required, it can be obtained by the driver pressing with his feet on the foot-board G. The cutters H are kept in a horizontal position and prevented from inclining to either side of the row of stalks, as the swinging frame E is attached to the frame A, which is mounted on wheels, thereby keeping the axle *d* always parallel to the axle attached to the frame A. The hooks N N are allowed, in consequence of having the springs O O attached to them, to yield or give to any obstruction they may meet, thus preventing them from being injured. In moving or transporting the machine, the hooks N N are turned backward, with their fronts uppermost, and held in that position by means of the hooks *j*, attached to the bar I, and the inner ends of the frames E and F are elevated, so as to raise the cutter H above the ground, by winding the rope M around the windlass L. The adjustment of the weight-bar K also serves to balance the frame A, counterpoising the weight of the driver on the seat D. The cutters H rotate without any extraneous power being applied to them, their own traction being sufficient for that purpose.

I do not claim separating the series of cutters, for they have been previously used; nor do I claim the hooks N N separately, or in themselves considered; but,

Having thus described my invention, what I do claim as new, and desire to secure by Letters Patent, is—

1. The combination of the frames A and E and the cutter H, when operating as and for the purpose shown and described.

2. The combination of the swinging frames E and F with the frame A, when constructed substantially as and for the purpose shown and described.

3. The combination of the frame E, curved rod or bar J, and adjustable weight-bar K, substantially as shown and described.

4. The combination of the gathering-hooks N with the springs O, substantially as and for the purpose shown and described.

5. The windlass L, secured to the axle on the frame A, in combination with the frames E and F, substantially as and for the purpose specified.

G. W. COLE.

Witnesses:
A. G. GRIDLEY,
G. W. WHITMER.